Sept. 10, 1940.  B. L. LANDRUM  2,214,250
VALVE
Filed March 4, 1939

B. L. Landrum
INVENTOR.

BY CA Snow & Co.
ATTORNEYS.

Patented Sept. 10, 1940

2,214,250

UNITED STATES PATENT OFFICE 2,214,250

VALVE

Benson Louis Landrum, Nocona, Tex.

Application March 4, 1939, Serial No. 259,887

1 Claim. (Cl. 251—137)

This invention relates to valve construction, the primary object of the invention being to provide a valve embodying a plurality of removable sections which may be readily and easily disconnected, thereby adapting the valve for various uses.

An important object of the invention is to provide a valve of this character which will insure a true seating of the valve at all times, regardless of the angle of operation of the valve.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
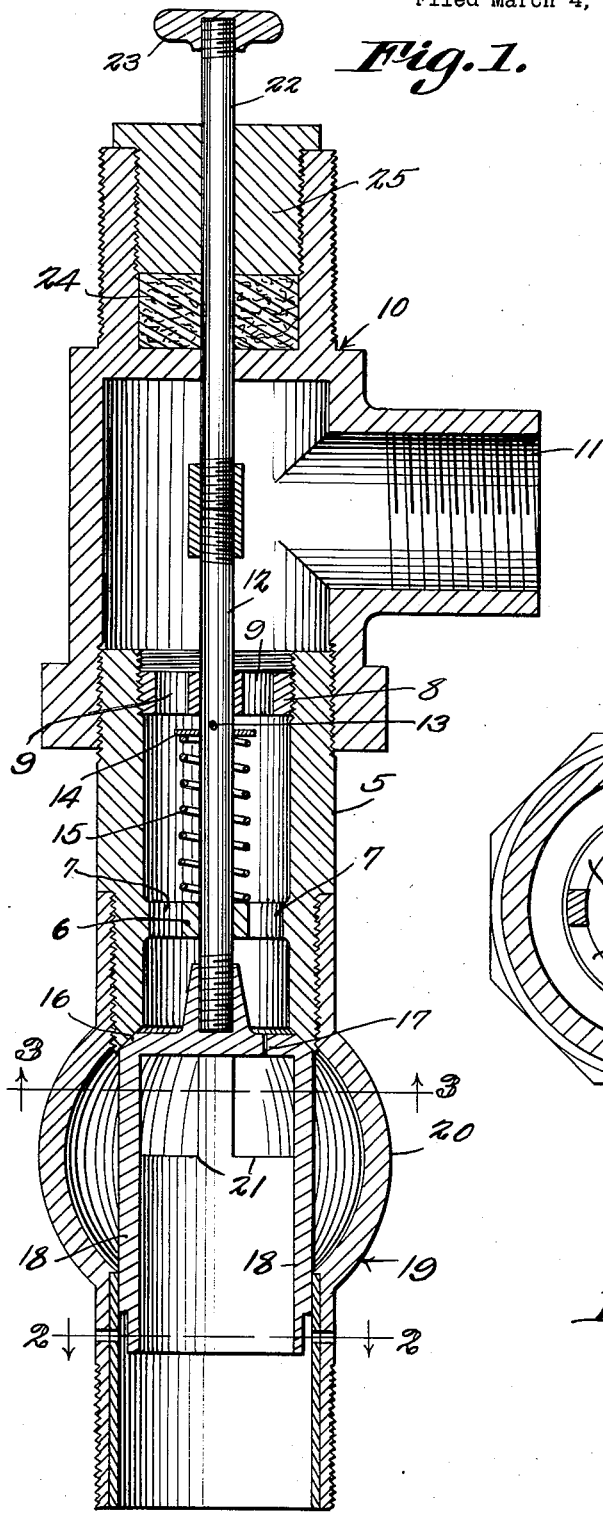
Figure 1 is a longitudinal sectional view through a valve constructed in accordance with the invention.
Figure 2:
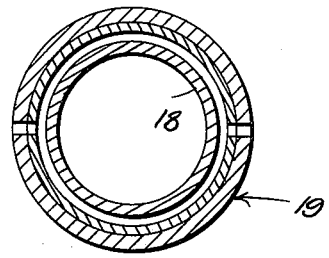
Figure 2 is a sectional view taken on line 2—2 of Figure 1.
Figure 3:
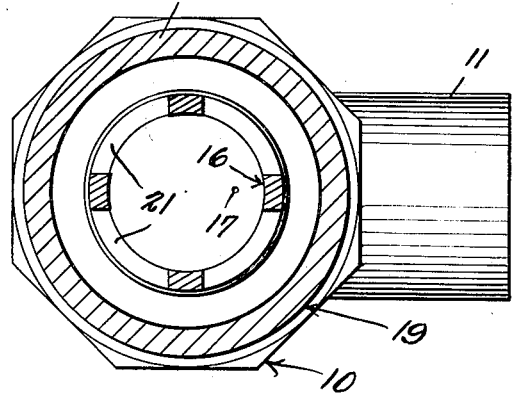
Figure 3 is a sectional view taken on line 3—3 of Figure 1.

Referring to the drawing in detail, the main section of the valve is indicated by the reference character 5, and as shown is provided with external threads disposed at the ends thereof.

Forming a part of the main section, is a valve guide 6, which is formed with lateral openings 7, through which fluid may pass in moving through the valve.

Internal threads are formed at one end of the main section 5, and accommodate the adjustable guide 8, which is also formed with openings indicated at 9, so that the liquid may pass through this guide member.

Secured to the external threads at the upper end of the main section 5, is an end section 10 which is provided with a lateral extension 11 to which a pipe may be secured for directing or releasing liquid from the valve.

The reference character 12 designates the valve rod, which operates through the guide members 6 and 8, the valve rod being provided with an opening to receive the pin 13 that engages the washer 14 against which the coiled spring 15 rests, the opposite end of the coiled spring 15 resting on the valve guide 6, to the end that the valve 16, which is positioned on one end of the valve stem 12, will be normally urged to its seat, at one end of the main section 5.

The valve 16 is formed with an opening 17 to vent the piston 18, which forms a part of the valve 16, the piston 18 being of a length to extend into the section 19 of the valve, which is shown as threaded on one end of the main section 5. The section 19 is formed with an enlarged portion 20 which is substantially spherical in formation, the enlarged portion providing a passageway so that liquid passing through the valve will not be obstructed. Openings 21 are formed in the piston 18, so that liquid may pass through the piston, and flow over the valve, on passing through the valve, in one direction.

When the valve is to be used as a hand operated valve in water lines, an extension rod indicated at 22 is provided and secured to one end of the valve stem 12, the free end of the extension rod 22 being supplied with a head 23, whereby the rod and valve may be moved to unseat the valve. The extension rod 22 moves through the packing 24, which is held in place by means of the nut 25, insuring a fluid-tight connection between the extension rod and valve housing.

The use of the extensions depends on the use to which the valve is to be put. For example, if the valve is to be employed for use as a check valve or multiple stage lift, section 10 will be removed and the valve embodying the main section 5 and section 19, will be positioned in the tubing of the well.

It is obvious that as the liquid moves upwardly through the tubing, it will be checked against downward movement by the valve, which is opened at predetermined intervals, allowing the liquid and gas to flow upwardly.

What is claimed is:

A valve comprising a body portion including a main section and a lower removable section, spaced bearings within the main section, said bearings having openings through which liquid passes, a valve seat at the lower end of the main section, a spherical portion formed intermediate the ends of the lower removable section, a hollow piston valve having the upper end closed and lower end open, operating through the spherical portion and being of a length to engage the lower removable section below the spherical portion, the upper end of the valve being beveled and adapted to engage the valve seat, cutting off passage of liquid through the main section, said valve having openings in the wall thereof through which liquid flows, a rod connected with the valve, said rod operating through said spaced bearings, and a spring mounted on the rod and adapted to normally urge the valve to its seat.

BENSON LOUIS LANDRUM.